(12) United States Patent
Stadtherr

(10) Patent No.: US 7,259,705 B2
(45) Date of Patent: Aug. 21, 2007

(54) TRACKING SUPPLY AC REGENERATION SYSTEM AND METHOD

(75) Inventor: Robert P. Stadtherr, Niwot, CO (US)

(73) Assignee: PS Audio, Boulder, CO (US)

( * ) Notice: Subject to any disclaimer, the term of this patent is extended or adjusted under 35 U.S.C. 154(b) by 0 days.

(21) Appl. No.: 11/345,000

(22) Filed: Feb. 1, 2006

(65) Prior Publication Data

US 2006/0187101 A1 Aug. 24, 2006

Related U.S. Application Data

(60) Provisional application No. 60/649,387, filed on Feb. 2, 2005.

(51) Int. Cl.
*H03M 1/66* (2006.01)
(52) U.S. Cl. .................... 341/147; 341/144
(58) Field of Classification Search ......... 341/125–170
See application file for complete search history.

(56) References Cited

U.S. PATENT DOCUMENTS

| 4,047,086 A * | 9/1977 | Cocksedge | 318/608 |
| 6,522,209 B2 * | 2/2003 | Hughes | 331/47 |
| 6,856,125 B2 * | 2/2005 | Kermani | 324/71.1 |

* cited by examiner

*Primary Examiner*—Lam T. Mai
(74) *Attorney, Agent, or Firm*—Haynes and Boone, LLP

(57) ABSTRACT

A circuit for implementing tracking supply alternating current ("AC") regeneration is described. In one embodiment, the circuit comprises a line synchronization device for converting an incoming AC signal to a square wave, wherein the square wave is precisely in phase with the incoming AC signal; a processor for processing the square wave to synthesize a sine wave therefrom; a digital to audio converter ("DAC") to convert the synthesized sine wave into an analog signal, wherein the analog signal is precisely in phase with the incoming AC signal; and an amplifier for amplifying the audio signal to a desired voltage level for driving a load.

20 Claims, 5 Drawing Sheets

TRACKING SUPPLY AC REGENERATION SYSTEM AND METHOD

CROSS-REFERENCE UNDER 35 U.S.C. §119(e)

This application claims the benefit of U.S. Provisional Patent Application Ser. No. 60/649,387, filed Feb. 2, 2005, which is hereby incorporated by reference in its entirety.

BACKGROUND

This invention relates to a system and method for regenerating alternating current for the purpose of producing a cleaner AC waveform, eliminating noise on the AC line and providing regulation and, more particularly, to such a system and method utilizing a tracking supply.

In many applications utilizing high-precision electrical components, it is desirable, if not necessary, that the source of AC power used to drive the components is at a constant voltage, so as not to compromise the performance of the components. In cases where the components are driven by ordinary house current that purports to supply 120 volts, variations in demands on the power grid supplying the voltage often cause this value to vary considerably.

Therefore, voltage regulator systems have evolved, many of which utilize autotransformers controlled by a motor or by switched taps. However, these systems are not without problems. For example, they can only correct the voltage in discrete steps and therefore do not completely eliminate the error between the desired voltage and the actual output. Also, they are inherently slow, and can only correct the voltage after it has been measured and determined to be wrong. Further, they do nothing to reduce harmonic distortion or noise and their circuitry increases the impedance of the power source.

Other regulation systems utilize power regenerators that create AC power from fixed DC supplies. However, these systems suffer primarily from extremely low efficiency, since the DC supplies are fixed, and have to be fairly high in magnitude in order to generate 120 VAC directly. The result is a great deal of voltage drop on the output devices. Also, the high voltages make MOSFET based switching designs impractical. Practical limitations (including efficiency and weight) make high power (>1000 W) systems unmanageable for the consumer electronics market.

Other regulation systems create a correction signal that is summed in with the AC input to create a "correct" output power waveform. These systems generally use an output transformer to sum the error signal, which increases the source impedance. They also rely on a measurement of the incoming voltage as a means of creating the error signal. This means the correction is limited by the capabilities of the error circuitry.

Therefore what is needed is a voltage regulation system that eliminates the above problems.

SUMMARY

One embodiment is a circuit for implementing tracking supply alternating current ("AC") regeneration. The circuit comprises a line synchronization device for converting an incoming AC signal to a square wave, wherein the square wave is precisely in phase with the incoming AC signal; a processor for processing the square wave to synthesize a sine wave therefrom; a digital to audio converter ("DAC") to convert the synthesized sine wave into an analog signal, wherein the analog signal is precisely in phase with the incoming AC signal; and an amplifier for amplifying the audio signal to a desired voltage level for driving a load.

Another embodiment is a method of implementing tracking supply alternating current ("AC") regeneration. The method comprises converting an incoming AC signal to a square wave that is precisely in phase with the incoming AC signal, wherein the square wave is at a first peak-to-peak voltage level; processing the square wave signal to generate a digital representation of a sine wave; converting the digital representation of the sine wave to an analog signal at a second peak-to-peak voltage level; and amplifying the analog signal to a desired level.

Another embodiment is a system of implementing tracking supply alternating current ("AC") regeneration. The system comprises means for converting an incoming AC signal to a square wave that is precisely in phase with the incoming AC signal, wherein the square wave is at a first peak-to-peak voltage level; means for processing the square wave signal to generate a digital representation of a sine wave; means for converting the digital representation of the sine wave to an analog signal at a second peak-to-peak voltage level; and means for amplifying the filtered analog signal to a desired level.

Still another embodiment is a tracking supply alternating current regeneration method comprising superimposing a dual direct current ("DC") supply voltage on a source of alternating current ("AC") power, and synchronizing the dual DC supply voltage with the AC power to produce a range of available tracking power supply voltages sufficient to feed a power amplifier producing a desired output voltage.

DETAILED DESCRIPTION

Figure 1:
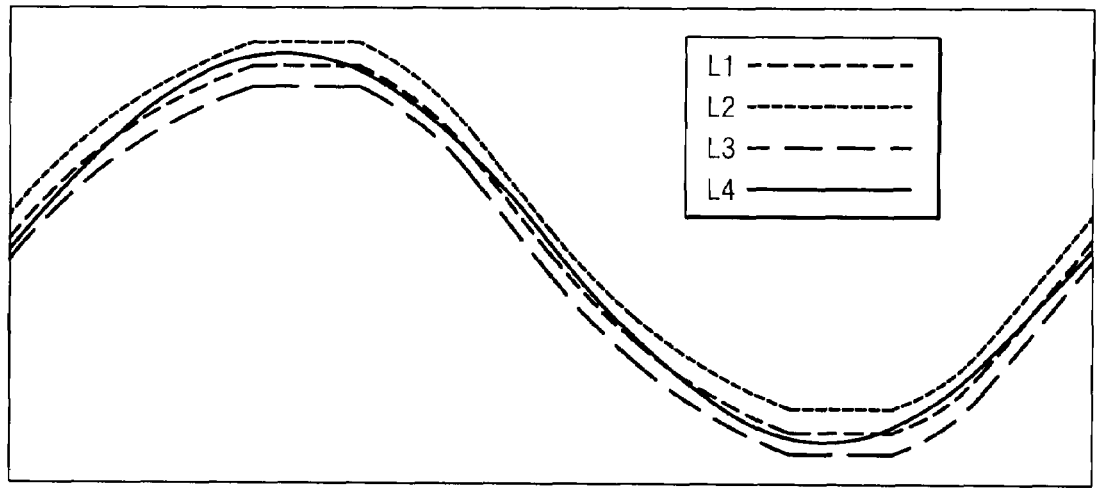
FIG. 1 is a graph depicting a typical waveform that is delivered from the power company, along with several other AC waveforms.

Referring to FIG. 1, a waveform L1 represents a typical waveform of AC power as it is delivered from a power provider. As can be seen from FIG. 1, the waveform L1 is generally not a perfect sine wave and the waveform shown has 5% of the 3rd harmonic thereof added in. Further, the 3rd harmonic lags the fundamental, creating an asymmetrical half cycle. Finally, the top of the waveform L1 is truncated to represent the distortions caused by rectifier/capacitor power supply loads.

Waveforms L2 and L3 represent the positive rails and the negative rails, respectively, of a tracking power supply. In this example, DC supplies are 18V, plus and minus, and referenced to the incoming AC signal. This creates a "window" of available power supply voltage from which a "correct" output power is regenerated. A waveform L4 represents an output in the form of a perfect 117VAC sine wave that extends between lines L2 and L3, which means that there is sufficient voltage available to create a perfect output waveform.

FIG. 2 is a schematic diagram of a regulator circuit 200 in accordance with one embodiment for implementing tracking supply AC power regeneration. The circuit 200 includes a primary tracking power supply stage 202 comprising a transformer T1, a bridge rectifier D7, and capacitors C1-C4. This circuit arrangement embodies the waveforms described in FIG. 1. A "Line In" signal on a line 203 is the distorted, unregulated mains voltage, corresponding to the waveform L1 in FIG. 1. For convenience, the other voltages are measured with respect to this voltage (hence the "signal-ground" symbol). The circuit nodes 204, 206, labeled "+15" and "−15", respectively, correspond to the waveforms L2 and L3, respectively, in FIG. 1. The transformer T1 itself is too large to be mounted directly on a printed circuit board comprising the circuit 200, thus terminals TB1-TB5 are used for these connections as well as the main input/output connections.

In accordance with one embodiment, the circuit 200 is used to digitally synthesize a very low distortion sine wave. The synthesized sine wave is precisely matched (within 0.001 Hz) to the frequency and phase of the incoming AC signal on the line 203; however, the voltage and wave shape of the incoming power are completely ignored. This signal is amplified to approximately 117VAC with respect to the AC neutral line and is then input to a power stage that supplies the current to a load (not shown) via a "Line Out" signal on a line 207. This signal is represented in FIG. 1 by the waveform L4.

Referring again to FIG. 2, a device U7, along with resistors R16 and R20 and diode D9, function as a line synchronization device 208 to convert the incoming AC voltage into a 5 volts peak-to-peak ("VPP") square wave that is precisely in phase with the incoming AC signal. The 5VPP signal is fed into a microprocessor U3. The microprocessor U3 performs three primary functions for the circuit 200, including a phase locked loop function, sine wave synthesis, or oscillator, function, and a system routines function.

The phase locked loop function performed by the microprocessor U3 is a software implementation of a 12-state, state machine phase comparator. This function has primarily 2 input signals and 2 output signals. The input signals consist of the incoming AC signal mentioned above and a similar square wave representation of the internal oscillator signal. It will be recognized that the sine wave does not truly exist as a real waveform, rather a virtual representation of it is within registers of the microprocessor U3. The state machine compares the two signals in a way that allows it to determine which signal is higher in frequency and which signal is advanced in phase, with respect to the other. The two output signals can be described simply as "speed up" and "slow down", which are fed to the sine wave synthesizer.

The sine wave synthesizer uses Direct Digital Synthesis ("DSS") techniques to create a variable frequency sine wave. DDS employs a pointer used to index a lookup table that contains sine wave data. At fixed intervals, the pointer is incremented by an amount proportional to the desired frequency. The larger the increment amount, the faster the pointer completes one cycle through the lookup table. Since the table consists of one complete sine wave, cycling through the table faster corresponds to a higher frequency. Using this technique, it is possible to vary the oscillator frequency within less than 0.001 Hz. The lookup table uses 16-bit precision, which allows the digital sine wave a distortion figure less than 0.01%. The digital signal generated in this manner is fed to a digital-analog converter ("DAC") U4.

The system routines performed by the microprocessor U3 include, at a minimum, monitoring the status of the phase locked loop function and operation of a bypass relay K1B, which connects the load directly to the incoming AC signal if the oscillator has not yet "locked" to the frequency of the incoming AC signal or if any other anomalous conditions are detected that warrant disconnecting the circuit 200 from the load.

The DAC U4 and its associated components, including device U5, resistor R10, and capacitor C10, function as an oscillator 210 to take the digital representation of a sine wave generated by the microprocessor U3 and convert it to an analog "real world" voltage signal at a level of approximately 2.5VPP. This 2.5VPP signal is precisely in phase with the incoming AC signal, but has extremely low harmonic distortion and is fixed in amplitude; i.e., it is not related to the amplitude of the incoming AC signal.

The 2.5VPP signal output from the DAC U4 is very low in harmonic distortion; however, it does have a DC component, as well as significant levels of noise at the DDS oscillator sample frequency (typically 6.4 KHz). A DAC output filter circuit 212 comprising an op-amp U1A, capacitors C11-C14, and resistors R1-R4 functions as an output filter that removes the DC component from the signal output from the DAC U4 and filters the sample noise to an acceptable level.

Op-amps U1B and U2 comprise a voltage amplifier stage 214, which amplifies the 2.5VPP (0.88VRMS) signal output from the DAC output filter 212 by approximately 133 in order to create a sine wave of 117VAC. This final voltage is adjustable somewhat by a variable resistor R17.

Op-amp U2 also serves as a first stage of a current amplifier stage 216, as it can supply output current up to 200 mA. Additionally, the high voltage capabilities thereof allow more headroom for and better utilization of the available main supply voltages. The current amplifier stage 216 also includes transistors Q1-Q4 and resistors R1-R4, which create a bipolar emitter-follower style current amplifier. The current amplifier stage 216 is enclosed within a feedback loop of DAC U4 in order to compensate for the voltage drops associated with the current stage components. Diodes D1-D6, together with capacitors C5-C8, comprise a voltage doubler type power supply 218, which creates the higher voltages required by U2.

Figure 3:
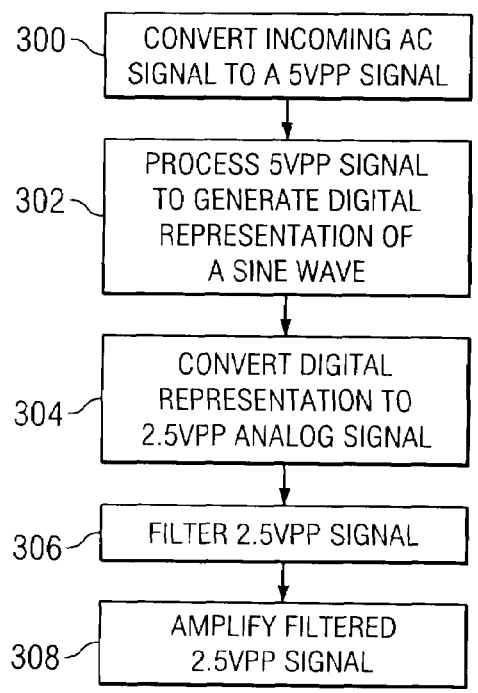
FIG. 3 is a flowchart depicting the operation of the regulator circuit of FIG. 2 according to an embodiment of the present disclosure.
Figure 2A:
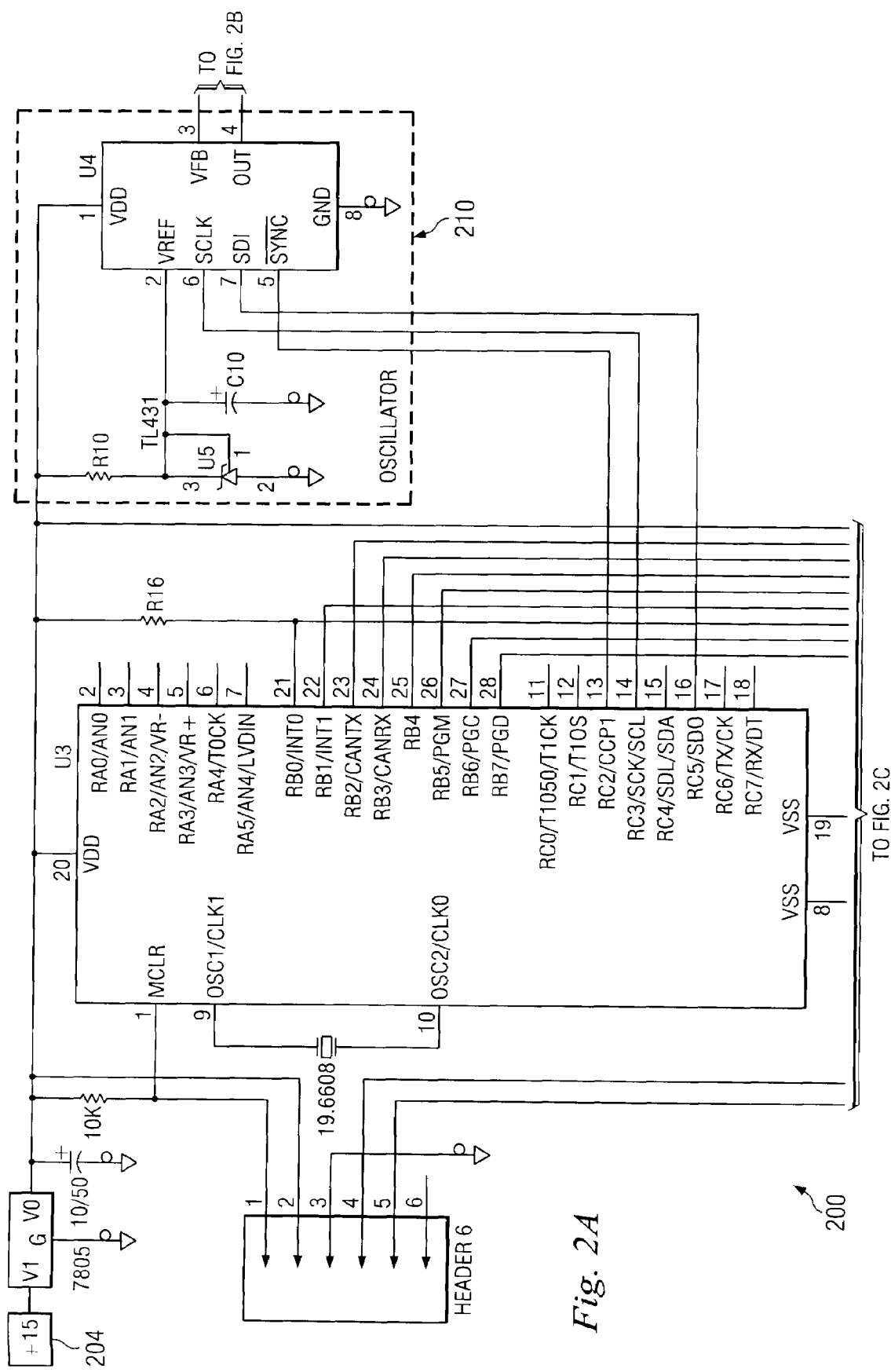
FIG. 2 is a schematic diagram depicting a regulator circuit according to an embodiment of the present disclosure for implementing tracking supply AC power regeneration.
Figure 2B:
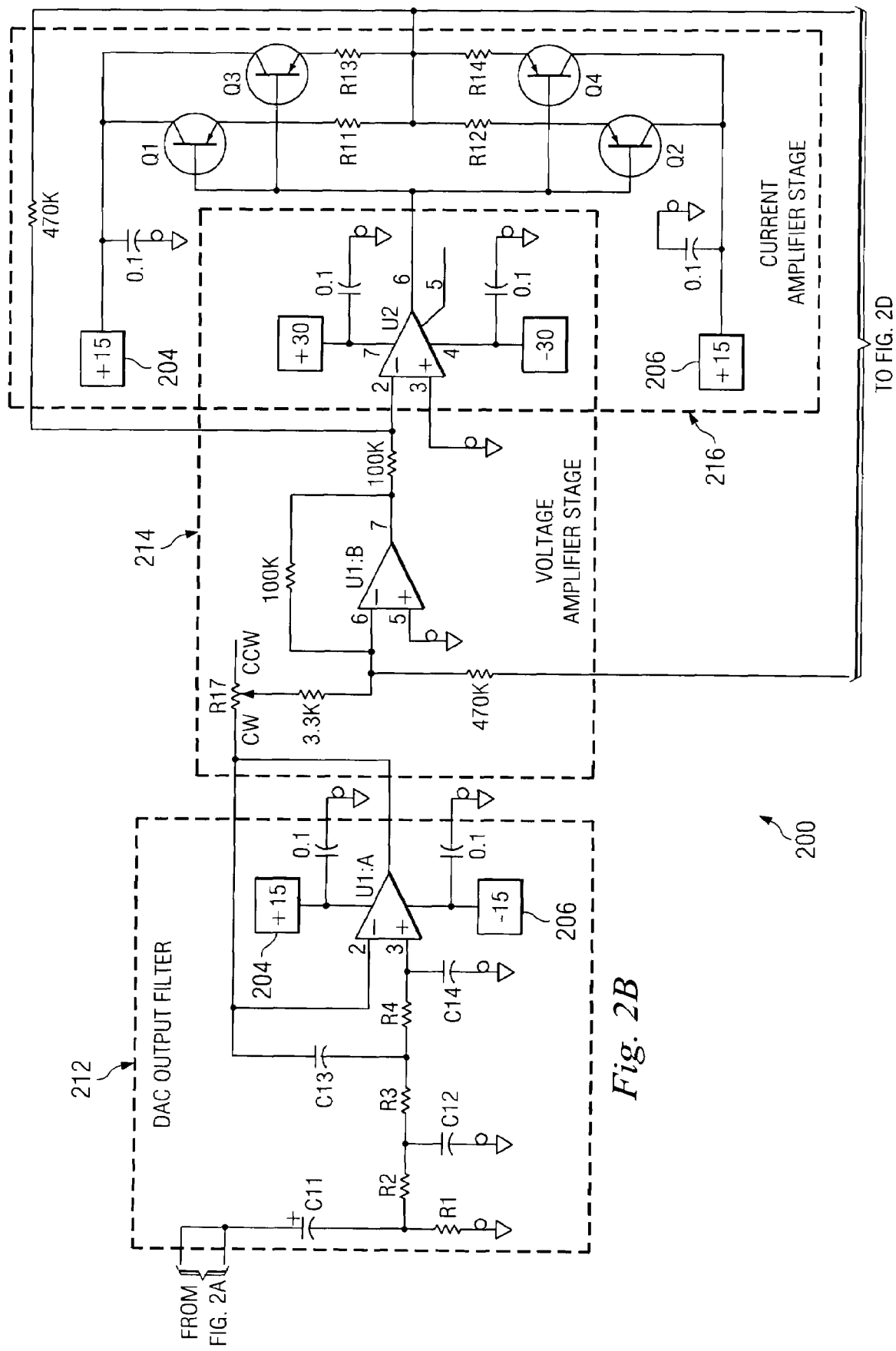
Figure 2C:
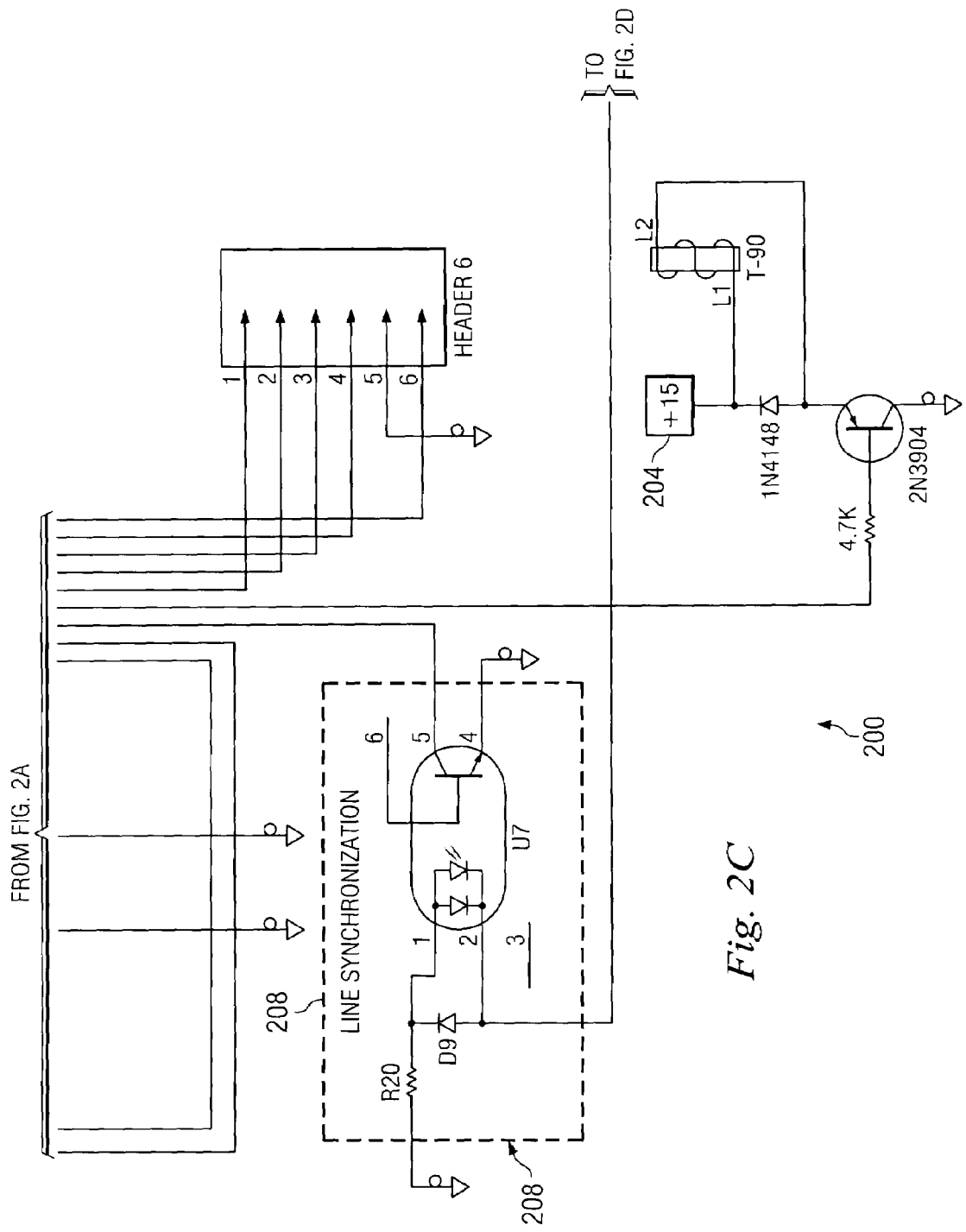
Figure 2D:
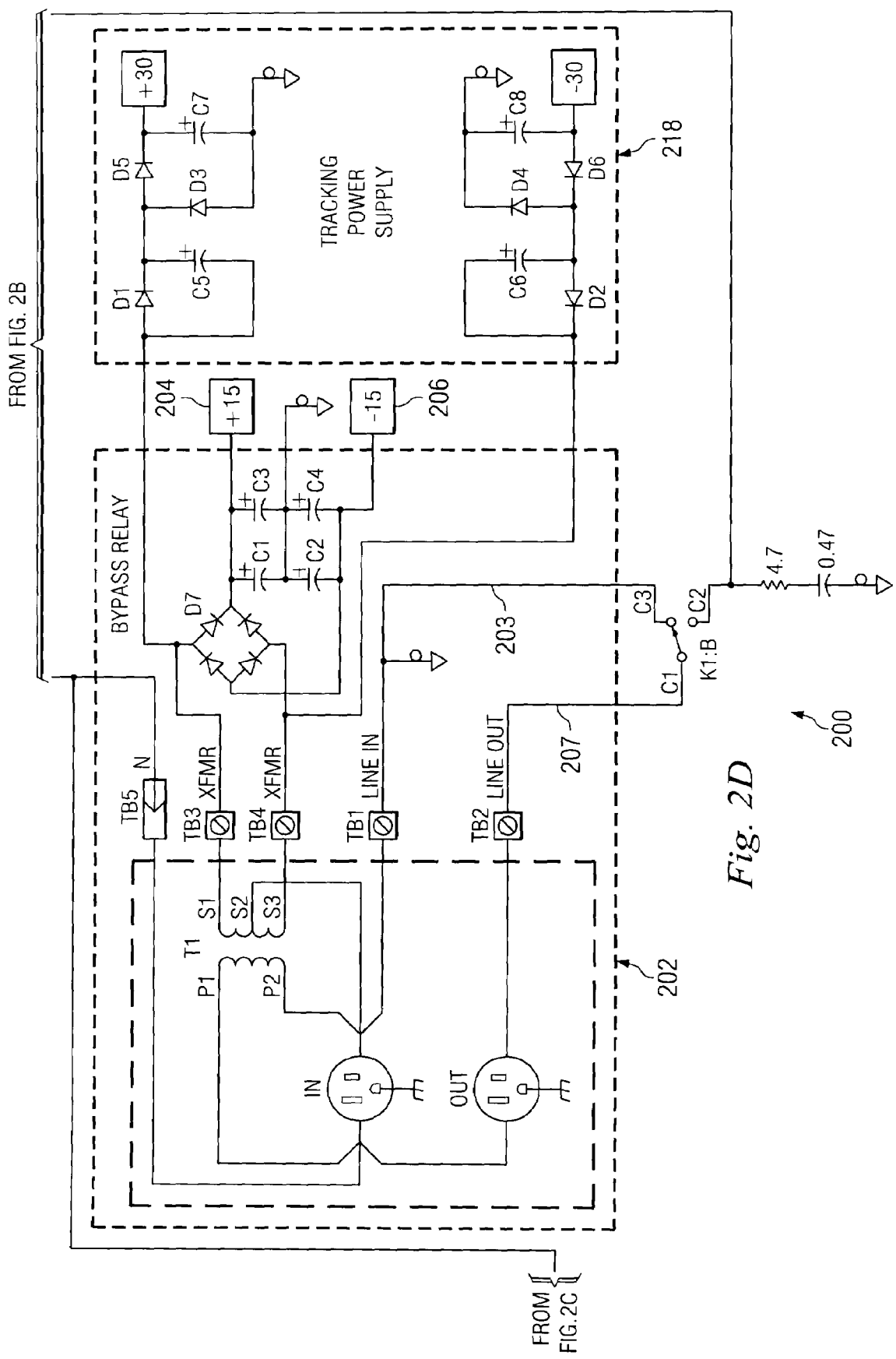

FIG. 3 is a flowchart depicting the operation of the regulator circuit of FIG. 2 according to an embodiment of the present disclosure. In step 300, the incoming AC signal is converted to a 5 volts peak-to-peak ("VPP") square wave that is precisely in phase with the incoming AC signal. In step 302, the 5VPP signal is processed to generate a digital representation of a sine wave. In the embodiment described herein, the processing of step 302 is performed by a microprocessor. Details of the processing are provided above in connection with the description of FIG. 2. In step 304, the digital representation of the sine wave generated by the microprocessor U3 is converted to an analog "real world" voltage signal at a level of approximately 2.5VPP. As previously indicated, the 2.5VPP signal is precisely in phase with the incoming AC signal, but has extremely low harmonic distortion and an amplitude that is not related to the amplitude of the incoming AC signal. In step 306, the 2.5VPP signal is then filtered to remove the DC component thereof and to filter the sample noise to an acceptable level. In step 308, the filtered 2.5VPP signal is amplified to a desired level.

As a result of the above, the output signal can be adjusted (if desired) infinitely to any voltage, since the output waveform on the line 207 is not simply a multiple of the input power, as is the case with an autotransformer, as discussed above. Also, since the output waveform is not dependant on the input waveform, shape, distortion, noise, and other anomalies can be eliminated. Further, since the DC voltages are superimposed on the incoming AC signal, the voltages seen by the power devices are much smaller than standard regenerators, thus improving efficiency and thus allowing higher power systems to be achieved in a smaller, lighter package than traditional regenerators. Finally, since the active output stage drives the load directly, without the use of transformers, the source impedance is very low. The active output stage can have a source impedance that is actually lower than the original AC power source.

Variations may be made in the foregoing without departing from the scope of the invention. Examples of variations include, but are not limited to, the following:

The power supplies may utilize other topologies and technologies. Although the above example uses a simple transformer-rectifier-capacitor supply, it is understood that other power supply designs, including switching type supplies, could be substituted.

The amplifier stage may utilize other topologies and technologies, such as class-D amplifier designs.

Parameters such as the tracking supply voltage, the DDS oscillator sample frequency, the resolution of the D/A converter, and the number and the type of output transistors, can be modified to meet the performance constraints of a particular application.

In addition to the "single-ended" implementation shown, in which the line voltage is regulated with respect to a fixed and unaltered neutral connection, multiple instances of the invention may be implemented in a "balanced" configuration, in which both line and neutral are regulated with respect to a common ground.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

What is claimed is:

1. A circuit for implementing tracking supply alternating current ("AC") regeneration, the circuit comprising:
   a line synchronization device for converting an incoming AC signal to a square wave, wherein the square wave is precisely in phase with the incoming AC signal;
   a processor for processing the square wave to synthesize a sine wave therefrom;
   a digital to audio converter ("DAC") to convert the synthesized sine wave into an analog signal, wherein the analog signal is precisely in phase with the incoming AC signal;
   an amplifier for amplifying the analog signal to a desired voltage level for driving a load.

2. The circuit of claim 1 further comprising a primary power supply stage for receiving the incoming AC signal from a source thereof and providing the incoming AC signal to the line synchronization device.

3. The circuit of claim 1 further comprising a filter for filtering the analog signal before the analog signal is amplified.

4. The circuit of claim 3 wherein the filter removes a DC component from the analog signal and filters sample noise of the analog signal to an acceptable level.

5. The circuit of claim 1 wherein the digital square wave is a 5 volts peak-to-peak square wave.

6. The circuit of claim 1 wherein the analog signal is approximately 2.5 volts peak-to-peak signal.

7. The circuit of claim 1 wherein the analog signal has extremely low harmonic distortion and wherein an amplitude of the analog signal is fixed and is not related to an amplitude of the incoming AC signal.

8. A method of implementing tracking supply alternating current ("AC") regeneration, the method comprising:
   converting an incoming AC signal to a square wave that is precisely in phase with the incoming AC signal, wherein the square wave is at a first peak-to-peak voltage level;
   processing the square wave signal to generate a digital representation of a sine wave;
   converting the digital representation of the sine wave to an analog signal at a second peak-to-peak voltage level; and
   amplifying the analog signal to a desired level.

9. The method of claim 8 wherein the first peak-to-peak voltage level is 5 volts.

10. The method of claim 8 wherein the second peak-to-peak voltage level is approximately 2.5 volts.

11. The method of claim 8 further comprising filtering the analog signal prior to amplifying the analog signal.

12. The method of claim 11 wherein the filtering comprises removing a DC component of the analog signal and filtering sample noise of the analog signal to an acceptable level.

13. The method of claim 8 wherein the analog signal is precisely in phase with the incoming AC signal and an amplitude of the analog signal is unrelated to an amplitude of the incoming AC signal.

14. A system for implementing tracking supply alternating current ("AC") regeneration, the system comprising:
   means for converting an incoming AC signal to a square wave that is precisely in phase with the incoming AC signal, wherein the square wave is at a first peak-to-peak voltage level;
   means for processing the square wave signal to generate a digital representation of a sine wave;
   means for converting the digital representation of the sine wave to an analog signal at a second peak-to-peak voltage level; and
   means for amplifying the analog signal to a desired level.

15. The system of claim 14 wherein the first peak-to-peak voltage level is 5 volts and wherein the second peak-to-peak voltage level is approximately 2.5 volts.

16. The system of claim 14 further comprising means for filtering the analog signal to remove a DC component of the analog signal and filter sample noise of the analog signal to an acceptable level.

17. The system of claim 14 wherein the analog signal is precisely in phase with the incoming AC signal and an amplitude of the analog signal is unrelated to an amplitude of the incoming AC signal.

18. The system of claim 14 wherein the means for converting an incoming AC signal to a square wave comprises a line synchronization circuit.

19. The system of claim 14 wherein the means for processing comprises a microprocessor for implementing direct digital synthesis ("DSS") techniques.

20. A tracking supply alternating current regeneration method comprising superimposing a dual direct current ("DC") supply voltage on a source of alternating current ("AC") power, and synchronizing the dual DC supply voltage with the AC power to produce a range of available tracking power supply voltages sufficient to feed a power amplifier producing a desired output voltage.

* * * * *